(No Model.) 2 Sheets—Sheet 1.
J. W. DE ATLEY.
COFFEE OR TEA POT.
No. 462,656. Patented Nov. 3, 1891.
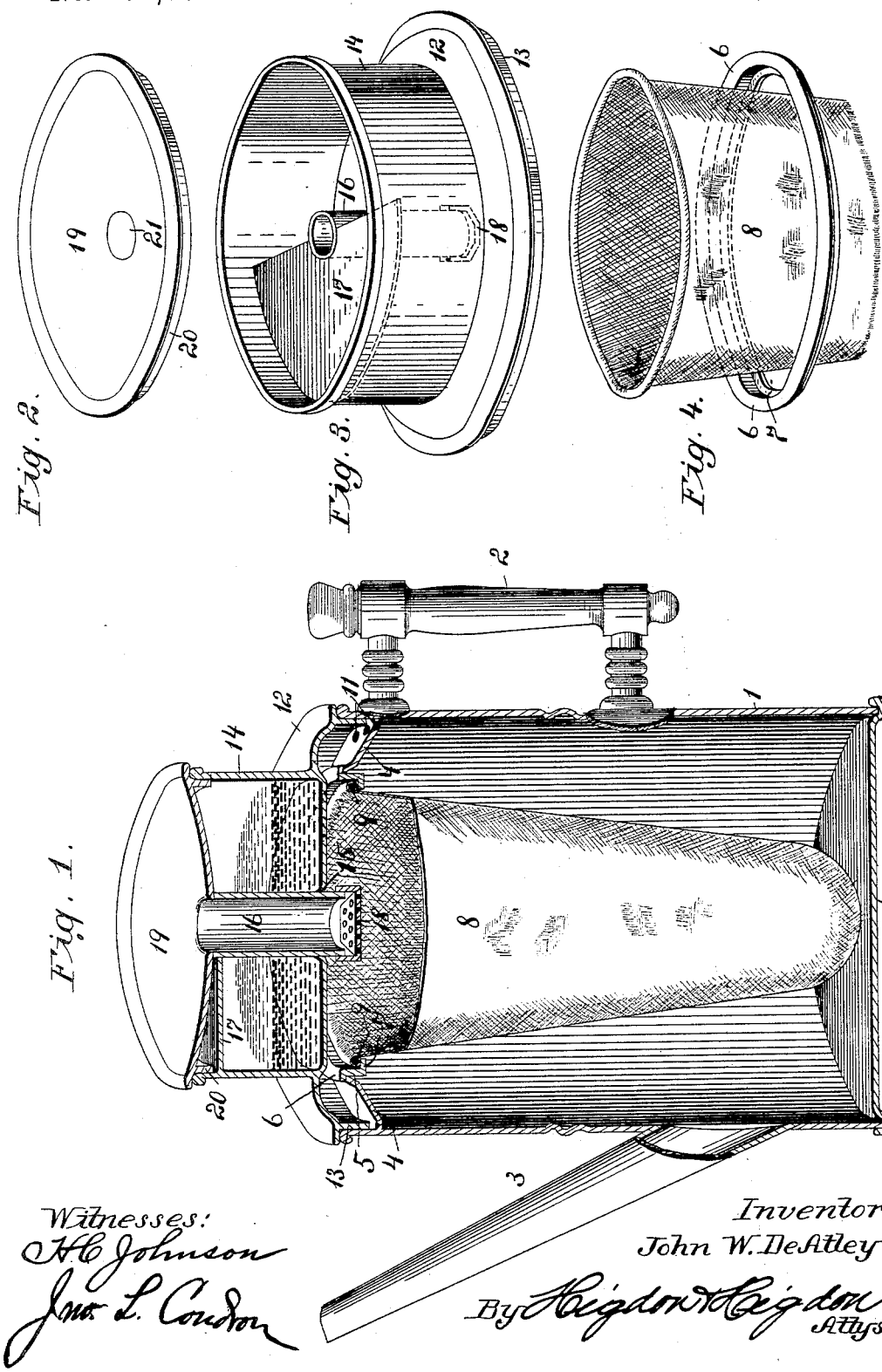
Witnesses:
H. C. Johnson
Jno. L. Condon
Inventor:
John W. DeAtley
By Higdon & Higdon
Attys.

(No Model.) 2 Sheets—Sheet 2.
J. W. DE ATLEY.
COFFEE OR TEA POT.
No. 462,656. Patented Nov. 3, 1891.
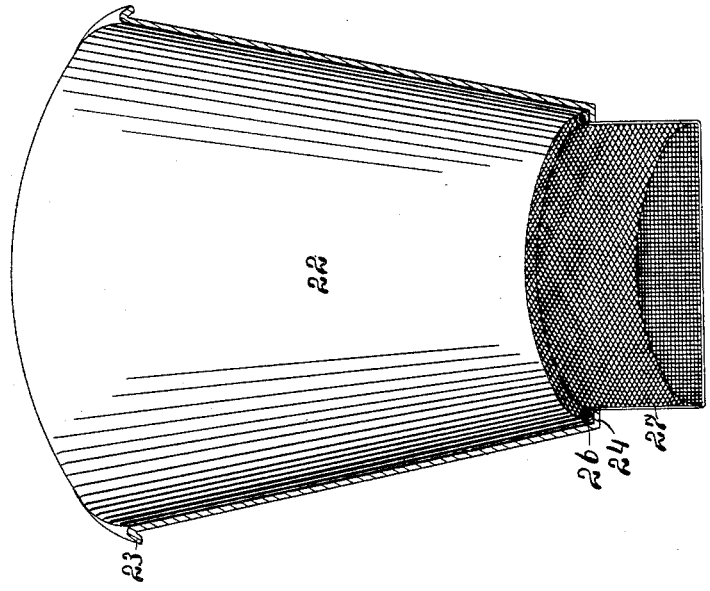
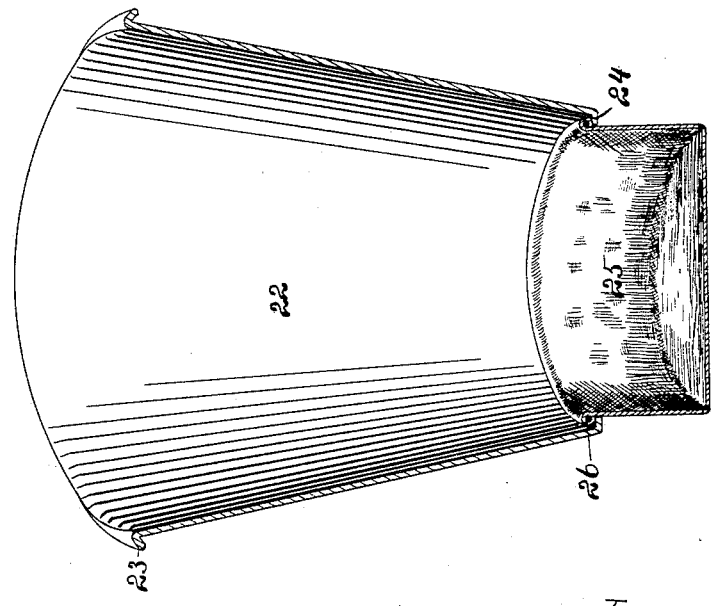
Witnesses:
Geo. Y. Thorpe.
Jno. L. Coudron.
Inventor:
John W. DeAtley
By Higdon & Higdon
Attys.

UNITED STATES PATENT OFFICE.

JOHN W. DE ATLEY, OF BLUE SPRINGS, MISSOURI.

COFFEE OR TEA POT.

SPECIFICATION forming part of Letters Patent No. 462,656, dated November 3, 1891.

Application filed June 16, 1891. Serial No. 396,479. (No model.)

*To all whom it may concern:*

Be it known that I, JOHN W. DE ATLEY, of Blue Springs, Jackson county, Missouri, have invented certain new and useful Improvements in Coffee or Tea Pots, of which the following is a full, clear, and exact description, reference being had to the accompanying drawings, forming a part hereof.

My invention relates to pots in which coffee, tea, or other similar articles are steeped or their essence extracted by means of hot water; and the objects of my invention are to produce a coffee or tea pot which shall be so constructed that the essence of the coffee or tea or other article can be quickly and easily extracted without any loss of aroma, and also to provide means whereby the condensing-water shall be prevented from spilling out of the pot while the liquid extract is being poured out of the latter.

A further object of my invention is to provide means for permitting the condensed vapor from the coffee-sack to flow back into the body of the pot.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a transverse vertical section of a coffee or tea pot embodying my invention. Fig. 2 is a detached perspective view of the concavo-convex cover of the condensing-chamber. Fig. 3 is a detached perspective view of the condensing-chamber with its cover removed and showing the pouring-shield. Fig. 4 is a detached perspective view of the supporting-ring for the sack, and also a similar view of the upper part of said sack. Fig. 5 is a central transverse vertical section of a modified form of sack-holder. Fig. 6 is a similar view of the same provided with a modified form of sack.

In the said drawings, 1 designates the body portion of my improved coffee or tea pot, said body portion being either of sheet metal, as shown, or of any other suitable or preferred material, and being also either of the precise form shown or of any other suitable or preferred form, and being furthermore of any desired degree of ornamental appearance. At one side this body portion is provided with a suitable handle 2 and opposite therefrom with a discharge spout or nozzle 3. In the upper part of this body 1 is placed a continuous flange 4, which extends upwardly and inwardly from the inner surface of the body and which sustains at its inner edge a supporting piece or ring 5. This support 5 is of approximately Z form in cross-section—that is to say, the upper part of the supporting piece or ring is formed with an outwardly-extending flange 6, while the lower part of said ring or support is formed with an inwardly-extending flange 7. The upper flange 6 rests upon inner edge of the flange 4 and thus sustains the ring or support in position, and said flange 6 may be either wholly separate from the flange 4, so that the support 5 can be removed bodily from the pot for cleaning, &c., or the flange 6 can be soldered or otherwise permanently secured to the inner edge of the flange 4, if preferred.

8 designates a sack, which is of muslin or of any other suitable or preferred material capable of retaining the ground coffee or tea or other article from which an extract is to be made. The upper edge of this sack is hemmed over, so as to inclose a wire ring 9, which rests upon the flange 7, and thus retains the sack in position upon the support 5, the said sack thus depending into the body 1 of the pot toward the bottom 10 thereof. The flange 4 is formed with one or any desired number of holes 11, for a purpose to be hereinafter explained.

12 designates the top of the pot, said top having on its under side a flange 13, which fits closely within the upper end of the body 1 of the pot. From the upper side of this top 12 extends the wall 14 of the condensing-chamber, the said wall being preferably circular in form and of any preferred height. In the center of the top 12 is formed an opening 15, and through this opening extends the lower end of a tube 16. This tube extends vertically upward within the condensing-chamber and its upper end is united to a pouring shield or guard 17. This shield or guard is of semicircular form at its outer margin, while its inner margin is straight in form, the outer margin being united to the inner surface of the wall 14 at the upper part thereof. The lower end of this tube is either perforated or is provided with a perforated cap-piece 18. This cap may be either of perforated sheet metal or of wire-gauze or other suitable material, as preferred.

19 designates the cover of the condensing-chamber, said cover being of concavo-convex form and having on its convex under side a flange 20, which fits closely within the upper end of the wall 14 of the condensing-chamber. At its center or middle the cover 19 is formed with an opening 21, which registers with the upper end of the tube 16, as shown.

In using the above-described coffee or tea pot the ground coffee or tea or other article from which a liquid extract is to be made is placed in the sack 8 and a suitable quantity of cold water is placed in the condensing-chamber. Boiling water is now poured upon the cover 19, the concave upper surface of which conducts the hot water to the opening 21, and thus allows the boiling water to flow downward through the tube 16. The perforated lower end of the tube causes the boiling water to spray itself upon the material in the sack, and thus thoroughly permeate such material and effectively extract all of its essence. The steam which rises from the boiling water after permeating the coffee or other material ascends and comes into contact with the bottom of the condensing-chamber and is condensed by the cold surface of such bottom, thus preventing any loss of aroma. This condensed steam now flows over the upper surface of the flange 4 and runs through its hole or holes 11 and thus returns to the interior of the pot. When the extract has been fully compleetd, so as to be of the desired strength, the extract is to be poured from the pot. It will be seen that in order to prevent the water from spilling out of the condensing-chamber as the pot is tipped for pouring the guard or shield 17 is provided. The top 12 is to be so placed upon the pot that the guard or thield 17 is adjacent to that side of the pot which is provided with the spout or nozzle 3, and as the top is tipped in pouring the water in the condensing-chamber will be retained therein by the guard or shield 17.

In Figs. 5 and 6 I have shown a modified form of the sack-support, which is to be used in lieu of the supporting-ring 5, above described. This support consists of an elongated frusto-conical piece of metal 22 or other equivalent material, which is entirely closed at its sides, and the upper edge or end of which is provided with an outwardly-extending flange 23, corresponding with the flange 6 of the support 5, while the lower end of the metal support 22 is formed with an inwardly-extending flange 24, corresponding with the flange 7 of the said supporting-ring 5, the support being thus, as before, of substantially Z form. The flange 23 is to be placed upon the inner margin of the flange 4 and is to be either entirely separate therefrom or is to be soldered or otherwise suitably secured thereto. A sack 25, of muslin or other fabric, (shown in Fig. 5,) corresponding with the sack 8, but shallower than the latter, is secured in the lower end of the support 22 by a wire 26, which is hemmed into the upper end of the sack, as before, and which rests upon the upper side of the flange 24. If preferred, a sack 27, of wire-gauze, may be substituted for the sack 25, just described, said sack 27 being shown in Fig. 6 and corresponding in depth or length with the sack 25 and having its upper edge bent and secured around a wire 26, which rests upon the upper side of the flange 24 of the support. From this description it will be seen that when the boiling water is poured through the tube 16, as above described, it is conducted directly to the coffee in the sack 25 or 27 by the inner surfaces of the support 22 and can only flow out through the sack at the lower end of the support. Owing to the solid form of the sides of the support 22 when the coffee is being poured, there is no possibility of the coffee extract flowing through the upper part of the support and thence out upon the flange 4, as it might do with the sack 8.

From the above description it will be seen that the pot is simple and compact in construction, and that the strength and aroma of the coffee or other material are fully preserved, and that no spilling of the condensing water can occur. It is to be observed that an additional advantage of the holes 11 is that if during the pouring operation any of the extract should flow out upon the flange 4 it can be quickly returned into the body of the pot by simply standing or holding the pot vertical for an instant, thus allowing the extract to run through the holes 11 back into the body of the pot, the same action taking place if the boiling water be poured too rapidly into the pot.

Having thus described my invention, what I claim as new therein, and desire to secure by Letters Patent, is—

An improved coffee or tea pot, comprising a suitable body portion provided at its upper part with an internal perforated flange extending upwardly and inwardly within said body portion, a Z-shaped support resting at its upper portion upon the inner margin of said flange, and a pendent receptacle for the tea or coffee, resting at its upper portion upon the lower portion of the said support, substantially as set forth.

In testimony whereof I affix my signature in presence of two witnesses.

JOHN W. DE ATLEY.

Witnesses:
F. G. FISCHER,
H. E. PRICE.